United States Patent
Lindenthal et al.

(10) Patent No.: US 12,415,535 B2
(45) Date of Patent: Sep. 16, 2025

(54) SYSTEMS AND METHODS TO CONTEXTUALLY ALERT A DRIVER OF IDENTIFIED OBJECTS IN A-PILLAR BLIND ZONES

(71) Applicant: GM GLOBAL TECHNOLOGY OPERATIONS LLC, Detroit, MI (US)

(72) Inventors: Steffen P Lindenthal, Oshawa (CA); Akram M Abdel-Rahman, Ajax (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 13 days.

(21) Appl. No.: 18/446,010

(22) Filed: Aug. 8, 2023

(65) Prior Publication Data

US 2025/0050898 A1 Feb. 13, 2025

(51) Int. Cl.
*B60W 50/14* (2020.01)
*B60K 35/00* (2006.01)
*B60K 35/10* (2024.01)
*B60K 35/28* (2024.01)
(Continued)

(52) U.S. Cl.
CPC ............ *B60W 50/14* (2013.01); *B60K 35/00* (2013.01); *B60K 35/10* (2024.01); *B60K 35/28* (2024.01); *B60K 35/29* (2024.01); *B60K 35/60* (2024.01); *B60K 2360/149* (2024.01); *B60K 2360/178* (2024.01); *B60K 2360/188* (2024.01); *B60K 2360/349* (2024.01); *B60K 2360/788* (2024.01); *B60W 2540/225* (2020.02); *B60W 2554/80* (2020.02)

(58) Field of Classification Search
CPC ........... B60W 50/14; B60W 2540/225; B60W 2554/80; B60K 35/00; B60K 2360/149; B60K 2360/178; B60K 35/28; B60K 35/29; B60K 2360/788; B60K 35/10; B60K 2360/188; B60K 35/60; B60K 2360/349
USPC ....................................... 340/425.5
See application file for complete search history.

(56) References Cited

U.S. PATENT DOCUMENTS 11,514,790 B2 * 11/2022 Grace ................. H04W 4/44
2005/0168695 A1 * 8/2005 Ooba ................. B60R 1/25
180/271

(Continued)

FOREIGN PATENT DOCUMENTS

DE 102016209552 A1 12/2017
DE 102017207968 A1 6/2018
DE 102019115425 A1 4/2020

*Primary Examiner* — Naomi J Small
(74) *Attorney, Agent, or Firm* — Ingrassia Fisher & Lorenz, LLP

(57) ABSTRACT

Methods and systems are provided for initiating an alert in a vehicle. A method includes: receiving sensor data associated with an environment of the vehicle; determining at least one road user based on the sensor data; determining at least one blind spot area associated with a pillar of the vehicle and the road scenario; determining that the at least one road user is a vulnerable road user based on the blind spot area and a size and location of the at least one road user; determining a line of sight of the driver; determining, by the processor, whether the at least one road user is within the line of sight of the driver; and in response to the determining whether the at least one road user is within the line of sight of the driver, selectively generating, by the processor, alert signal data to an alert system of the vehicle.

20 Claims, 4 Drawing Sheets

(51) Int. Cl.
  *B60K 35/29*    (2024.01)
  *B60K 35/60*    (2024.01)

(56)        References Cited

U.S. PATENT DOCUMENTS

| | | | |
|---|---|---|---|
| 2008/0239527 A1* | 10/2008 | Okabe | B60R 1/25 |
| | | | 359/843 |
| 2017/0297488 A1 | 10/2017 | Wang et al. | |
| 2018/0272940 A1* | 9/2018 | Saeki | G06V 20/58 |
| 2020/0239007 A1* | 7/2020 | Sobhany | G05D 1/0061 |
| 2020/0391752 A1* | 12/2020 | Hagiwara | G06V 10/80 |
| 2021/0097147 A1* | 4/2021 | DeVore | G06F 18/22 |
| 2021/0162924 A1* | 6/2021 | Ohyama | G02B 27/0101 |
| 2021/0166564 A1* | 6/2021 | Takaki | G08G 1/166 |
| 2021/0276586 A1* | 9/2021 | Chen | G08G 1/167 |
| 2021/0363670 A1* | 11/2021 | Abouraddy | D03D 15/573 |
| 2022/0222475 A1* | 7/2022 | Oesterling | G08G 1/166 |
| 2022/0314886 A1* | 10/2022 | Oigawa | G02B 27/0101 |
| 2023/0087743 A1* | 3/2023 | Deng | B60W 50/14 |
| | | | 701/1 |
| 2023/0158889 A1* | 5/2023 | Fujimoto | B60K 35/60 |
| | | | 340/438 |
| 2023/0192115 A1* | 6/2023 | Ono | B60Q 3/80 |
| | | | 340/435 |
| 2024/0124011 A1* | 4/2024 | Alzuhd | B60W 50/14 |

\* cited by examiner

SYSTEMS AND METHODS TO CONTEXTUALLY ALERT A DRIVER OF IDENTIFIED OBJECTS IN A-PILLAR BLIND ZONES

INTRODUCTION

The technical field generally relates to alert systems and methods of a vehicle, and more particularly relates to systems and methods that contextually alert the driver of vulnerable road users in an a-pillar blind zone or area.

A vehicle body, which forms the outer shape of a vehicle, generally includes a floor panel forming the lower part of the vehicle, a frame for the strength of the vehicle body, pillars arranged on the side walls of the vehicle body, a roof panel forming an upper part of the vehicle body forms, and doors.

While driving, a driver usually sees the front surrounding area through a windshield of the vehicle, sees the rear surrounding area or side rear surrounding areas through a rear-view mirror or side mirror, and sees the side surrounding areas on the left and right of the vehicle through door windows of the vehicle. In this case, pillars of a vehicle can disturb the front and side fields of vision of a driver when driving. This means that the pillars in the front and side areas of a vehicle create so-called "blind spots." In some instances, pedestrians, cyclists, or other vehicles can be present in these "blind spots" without the driver being aware.

Accordingly, it is desirable to provide methods and systems to contextually alert the driver of identified objects within the "blind spots." Furthermore, other desirable features and characteristics of the present disclosure will become apparent from the subsequent detailed description and the appended claims, taken in conjunction with the accompanying drawings and the foregoing technical field and background.

SUMMARY

Methods and systems are provided for initiating an alert to a driver in a vehicle. In one embodiment, a method includes: receiving, by a processor, sensor data associated with an environment of the vehicle; determining, by the processor, at least one road user based on the sensor data; determining, by the processor, at least one blind spot area associated with a pillar of the vehicle and a road scenario; determining, by the processor, that the at least one road user is a vulnerable road user based on the blind spot area and a size and location of the at least one road user; determining, by the processor, a line of sight of the driver; determining, by the processor, whether the at least one road user is within the line of sight of the driver; and in response to the determining whether the at least one road user is within the line of sight of the driver, selectively generating, by the processor, alert signal data to an alert system of the vehicle.

In various embodiments, the method includes determining a percent within the at least one blind spot of the at least one road user based on the size and the location of the at least one road user, and wherein the determining the at least one road user is the vulnerable road user is based on the percent within the at least one blind spot.

In various embodiments, the method includes comparing the percent within the at least one blind spot to a threshold percent, and wherein the determining that the at least one road user is the vulnerable road user is based on the comparing.

In various embodiments, the method includes defining the at least one blind spot area based on the road scenario, a dimension of the pillar, and an orientation of the pillar.

In various embodiments, the determining that the at least one road user is the vulnerable road user is further based on a threshold time within the blind spot area, and wherein the threshold time is based on a distance of the at least one road user from the vehicle.

In various embodiments, when it is determined that the vulnerable road user is not within the line of sight of the driver, monitoring the line of sight of the at least one road user for a change, and when the change does not exceed a threshold change generating the alert signal data to the alert system of the vehicle.

In various embodiments, the alert system includes color changing fabric associated with the pillar of the vehicle.

In various embodiments, the alert system includes at least one light configured to illuminate the pillar of the vehicle.

In various embodiments, the alert signal data includes at least one of a color, a brightness, and a frequency of light to be illuminated by the alert system.

In another embodiment, a system includes: a controller configured to, by a processor: receive sensor data associated with an environment of the vehicle; determine at least one road user based on the sensor data; determine at least one blind spot area associated with a pillar of the vehicle and a road scenario; determine that the at least one road user is a vulnerable road user based on the blind spot area and a size and location of the at least one road user; determine a line of sight of the driver; determine whether the at least one road user is within the line of sight of the driver; and in response to the determining whether the at least one road user is within the line of sight of the driver, selectively generate alert signal data to an alert system of the vehicle.

In various embodiments, the controller is further configured to determine a percent within the at least one blind spot of the at least one road user based on the size and the location of the at least one road user, and wherein the determining the at least one road user is the vulnerable road user is based on the percent within the at least one blind spot.

In various embodiments, the controller is further configured to compare the percent within the at least one blind spot to a threshold percent, and wherein the determining that the at least one road user is the vulnerable road user is based on the comparing.

In various embodiments, the controller is further configured to define the at least one blind spot area based on the road scenario, a dimension of the pillar, and an orientation of the pillar.

In various embodiments, the controller is further configured to determine that the at least one road user is the vulnerable road user further based on a threshold time within the blind spot area, and wherein the threshold time is based on a distance of the at least one road user from the vehicle.

In various embodiments, the controller is further configured to when it is determined that the vulnerable road user is not within the line of sight of the driver, monitor the line of sight of the at least one road user for a change, and when the change does not exceed a threshold change, generate the alert signal data to the alert system of the vehicle.

In various embodiments, the alert system includes color changing fabric associated with the pillar of the vehicle.

In various embodiments, the alert system includes at least one light configured to illuminate the pillar of the vehicle.

In various embodiments, the at least one light is configured along a side of the pillar.

In various embodiments, the at least one light is integrated with the pillar.

In various embodiments, the alert signal data includes at least one of a color, a brightness, and a frequency of light to be illuminated by the alert system.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
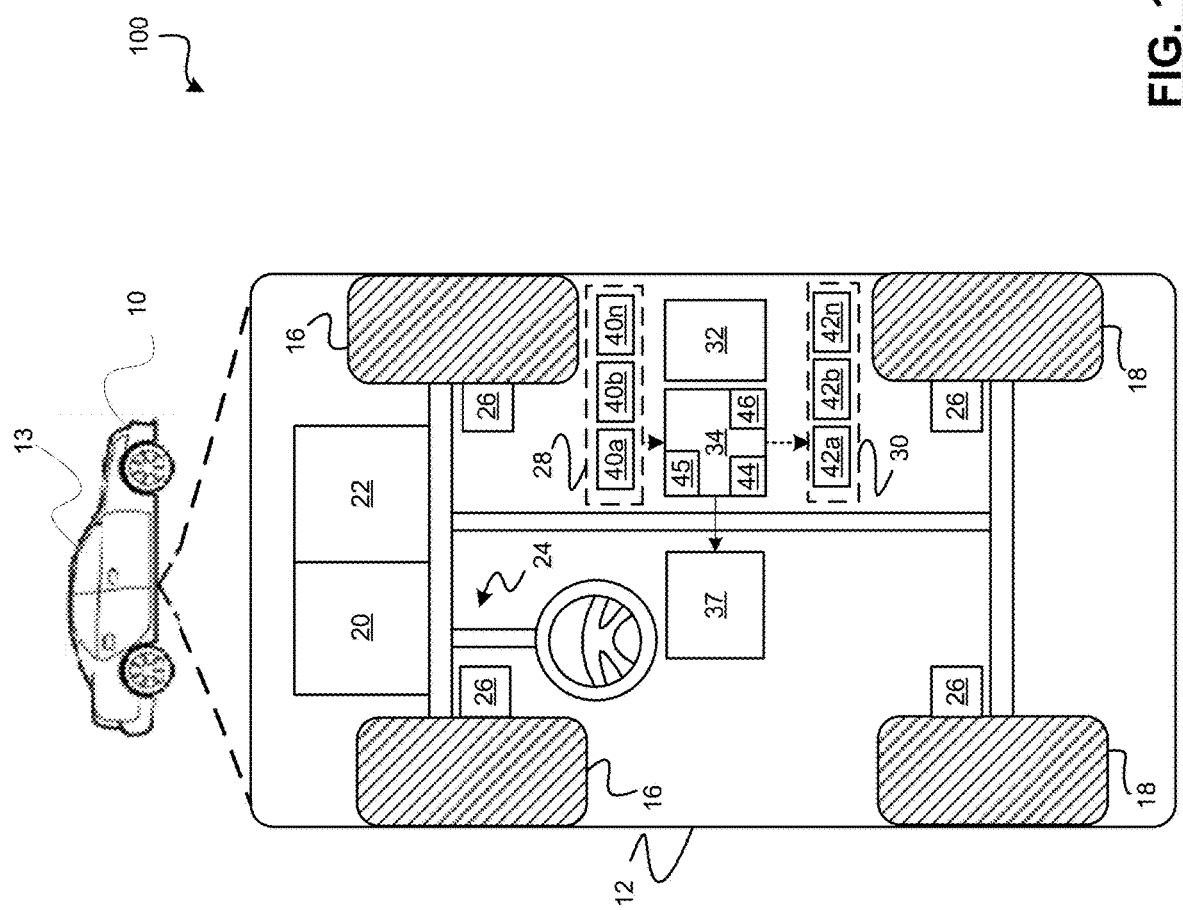
FIG. 1 is a block diagram illustrating a vehicle having a blind spot alert system, in accordance with various embodiments.

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

The following detailed description is merely exemplary in nature and is not intended to limit the application and uses. Furthermore, there is no intention to be bound by any expressed or implied theory presented in the preceding technical field, background, summary, or the following detailed description. As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein are merely exemplary embodiments of the present disclosure.

For the sake of brevity, conventional techniques related to signal processing, data transmission, signaling, control, machine learning models, radar, lidar, image analysis, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

With reference to FIG. 1, a blind spot alert system shown generally at 100 is associated with a vehicle 10 in accordance with various embodiments. In general, the blind spot alert system 100 identifies vulnerable road users due to blind spots associated with one or more pillars of the vehicle 10 and strategically generates alerts to the driver or other vehicle users to notify the driver or other vehicle users of the vulnerable road user.

As depicted in FIG. 1, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

In various embodiments, the frame includes pairs of pillars 13 that support a rooftop at each side of the vehicle 10. The pairs of pillars are commonly labeled from the front of the vehicle 10 to the rear of the vehicle 10 as A-pillars, B-pillars, C-pillars, D-pillars, etc. The pairs of pillars 13 are typically arranged alongside one or two windows of the vehicle 10 according to a vertical or partially vertical arrangement. For example, the pair of A-pillars is arranged to staddle a windshield of the vehicle 10.

As shown, the vehicle 10 generally includes a propulsion system 20, a transmission system 22, a steering system 24, a brake system 26, a sensor system 28, an actuator system 30, at least one data storage device 32, at least one controller 34, a communication system 36, and an alert system 37. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16-18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16-18. The brake system 26 may, in various embodiments, include friction brakes, brake by wire, a regenerative braking system such as an electric machine, and/or other appropriate braking systems. The steering system 24 influences a position of the of the vehicle wheels 16-18 and may or may not include a steering wheel as shown.

The sensor system 28 includes one or more sensing devices 40*a*-40*n* that sense observable conditions of the exterior environment and/or the interior environment or cabin of the vehicle 10. The sensing devices 40*a*-40*n* can include, but are not limited to, radars, lidars, global positioning systems, optical cameras, thermal cameras, ultrasonic sensors, and/or other sensors. The actuator system 30 includes one or more actuator devices 42*a*-42*n* that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, windows, a trunk, and cabin features such as air, music, lighting, etc. (not numbered).

The alert system 37 includes interior ambient surface lights and/or color changing fabric. In various embodiments, the fabric or lights can be integrated within the pillars 13 (e.g., the A-pillars), or multiple lights/areas of fabric can be coordinated to point towards the pillars 13, for example, on doors trims, the dashboard, etc.

Figure 2:
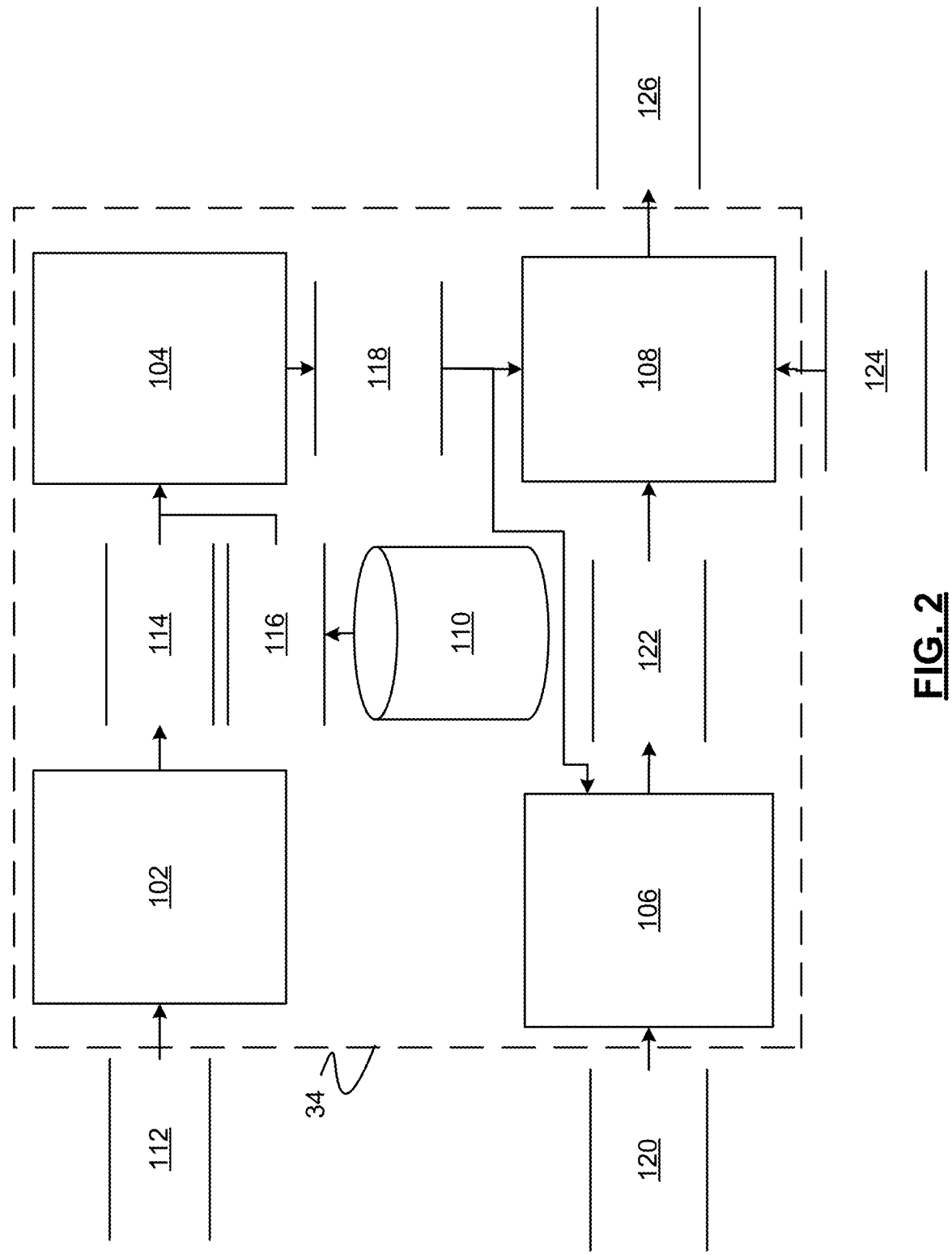
FIG. 2 is a dataflow diagram illustrating features of the blind spot alert system, in accordance with various embodiments.

The communication system 36 is configured to wirelessly communicate information to and from other entities 48, such as but not limited to, other vehicles ("V2V" communication,) infrastructure ("V2I" communication), remote systems, and/or personal devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional, or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The data storage device 32 stores data for use in controlling the vehicle 10. In various embodiments, the data storage device 32 stores defined maps of the navigable environment. In various embodiments, the defined maps may be predefined by and obtained from a remote system. For example, the defined maps may be assembled by the remote system and communicated to the vehicle 10 (wirelessly and/or in a wired manner) and stored in the data storage device 32. As can be appreciated, the data storage device 32 may be part of the controller 34, separate from the controller 34, or part of the controller 34 and part of a separate system.

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semi-conductor-based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although only one controller 34 is shown in FIG. 1, embodiments of the vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the vehicle 10.

In various embodiments, as discussed in detail below, one or more instructions of the controller 34 are embodied in the blind spot alert system 100 and, when executed by the processor 44, process sensor data and/or other data in order to determine road users that are vulnerable to the blind spots created by the pillars of the vehicle 10. The instructions of the controller 34, when executed by the processor 44, generate alert signals to the alert system 37 to strategically notify the driver or other vehicle users of the identified vulnerable road user.

In various embodiments, the vehicle 10 is an autonomous or semi-autonomous vehicle and the blind spot alert system 100 is incorporated into the autonomous or semi-vehicle 10. For example, the vehicle 10 may be configured to perform autonomous features such as, but not limited to, adaptive cruise control, super cruise, ultra-cruise, etc. where a driver and/or other users are present within the vehicle 10. The vehicle 10 is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used.

With reference now to FIG. 2 and with continued reference to FIG. 1, a dataflow diagram illustrates elements of the blind spot alert system 100 of FIG. 1 in accordance with various embodiments. As can be appreciated, various embodiments of the blind spot alert system 100 according to the present disclosure may include any number of modules embedded within the controller 34 which may be combined and/or further partitioned to similarly implement systems and methods described herein. Furthermore, inputs to the blind spot alert system 100 may be received from the sensor system 28, received from other control modules (not shown) associated with the vehicle 10, and/or determined/modeled by other sub-modules (not shown) within the controller 34 of FIG. 1. Furthermore, the inputs might also be subjected to preprocessing, such as sub-sampling, noise-reduction, normalization, feature-extraction, missing data reduction, and the like.

Figure 3:
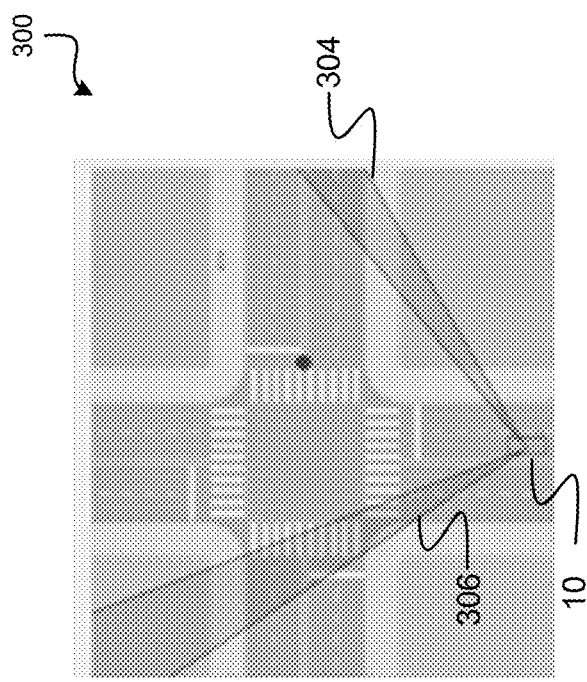
FIG. 3 is an illustration of display elements of the blind spot alert system, in accordance with various embodiments.

In various embodiments, the controller 34 includes a road user identification module 102, a vulnerable road user identification module 104, a line of sight identification module 106, an alert generation module 108, and a blind spot data datastore 110. In various embodiments, the blind spot data datastore 110 stores data defining the area in the environment of blind spots due to the pillars 13 of the vehicle 10. For example, as shown in FIG. 3, a first blind spot area 302 is defined relative to a map of an intersection 300 in the roadway and the A-pillar on the driver side of the vehicle 10, and a second blind spot area 304 is defined relative to the mapped intersection 300 and the A-pillar on the passenger side of the vehicle 10. The areas are defined based on the dimensions and orientation of the A-pillars 13 of the vehicle 10. As can be appreciated, similar blind spot areas can be defined relative to other pillars 13 of the vehicle 10 and other mapped road scenarios as the disclosure is not limited to the embodiment shown.

With reference back to FIG. 2, the blind spot data datastore 110 further stores blind spot data defining one or more threshold times for a user to be within the defined areas. In various embodiments, the threshold times are associated with distances from the vehicle 10. In various embodiments, the blind spot data datastore 110 further stores blind spot data defining one or more threshold percentages of a user to be within the defined areas.

In various embodiments, the road user identification module 102 receives as input sensor data 112 from, for example, the exterior environment sensors of the sensor system 28. The road user identification module 102 identifies road users in the environment of the vehicle 10 and certain characteristics thereof (e.g., trajectory, range, or distance from the vehicle 10, size of the user, type of the user, etc.) based on one or more machine learning and/or classification techniques. The road user identification module 102 generates road user data 114 based thereon.

In various embodiments, the vulnerable road user identification module 104 receives as input the road user data 114. The vulnerable road user identification module 104 determines whether any of the identified road users are vulnerable to the blind spots of the vehicle 10, including the passenger side blind spot or the driver side blind spot. For example, the vulnerable road user identification module 104 retrieves the blind spot definition data 116 from the blind spot data datastore 110 and compares the location and/or size of the road user to the blind spot areas to determine a percent of the road user that is located within the blind spot area. When the percent of the road user is greater than the defined threshold percent (e.g., 50%) in the driver side blind spot area or is greater than the defined threshold percent (e.g., 60%) in the passenger side blind spot area, then vulnerable road user identification module 104 generates road user data to track that the road user is deemed vulnerable in the identified blind spot area.

The vulnerable road user identification module 104 then determines the time the road user is deemed vulnerable. When the road user is deemed vulnerable for the defined threshold time associated with the range or distance of the road user, the vulnerable road user identification module 104 generates vulnerable road user data 118 to indicate that the road user is deemed vulnerable in the identified blind spot area.

In various embodiments, the line of sight identification module 106 receives as input the vulnerable road user data 118, and sensor data 120 from, for example, the interior environment sensors of the sensor system 28. The line of sight identification module 106 determines the line of sight of the driver based on the sensor data 120. The line of sight identification module 106 then determines whether the vulnerable road user is within the line of sight of the driver.

When the vulnerable road user is within the line of sight of the driver, the line of sight identification module 106 generates sight data 122 indicating that the driver has noticed the vulnerable road user. When the vulnerable road user is not within the line of sight of the driver, the line of sight identification module 106 determines whether a change in head position or eye gaze of the driver is above a threshold (e.g., a value to indicate a change due to the driver noticing the road user) based on the sensor data 120. When the change in head position or eye gaze of the driver is above the threshold, the line of sight identification module 106 generates sight data 122 indicating that the driver has noticed the vulnerable road user. When it is determined that a change in head position or eye gaze of the driver is below the threshold, the line of sight identification module 106 generates sight data 122 indicating that the driver has not noticed the vulnerable road user.

In various embodiments, the alert generation module 108 receives as input the sight data 122, and ambient light data 124. When the sight data 122 indicates that the driver has not noticed the vulnerable road user, the alert generation module 108 determines the alert type and generates alert signal data 126 based thereon. For example, the alert generation module 108 generates alert signals to the alert system 37 to cause the lights and/or fabric to dynamically change color and/or brightness and/or frequency and seemingly "flow" (i.e., provide concentric movement) from all three directions (i.e., dashboard, door, A-pillar) towards the pillar 13 or to just highlight the pillar 13.

Figure 4:
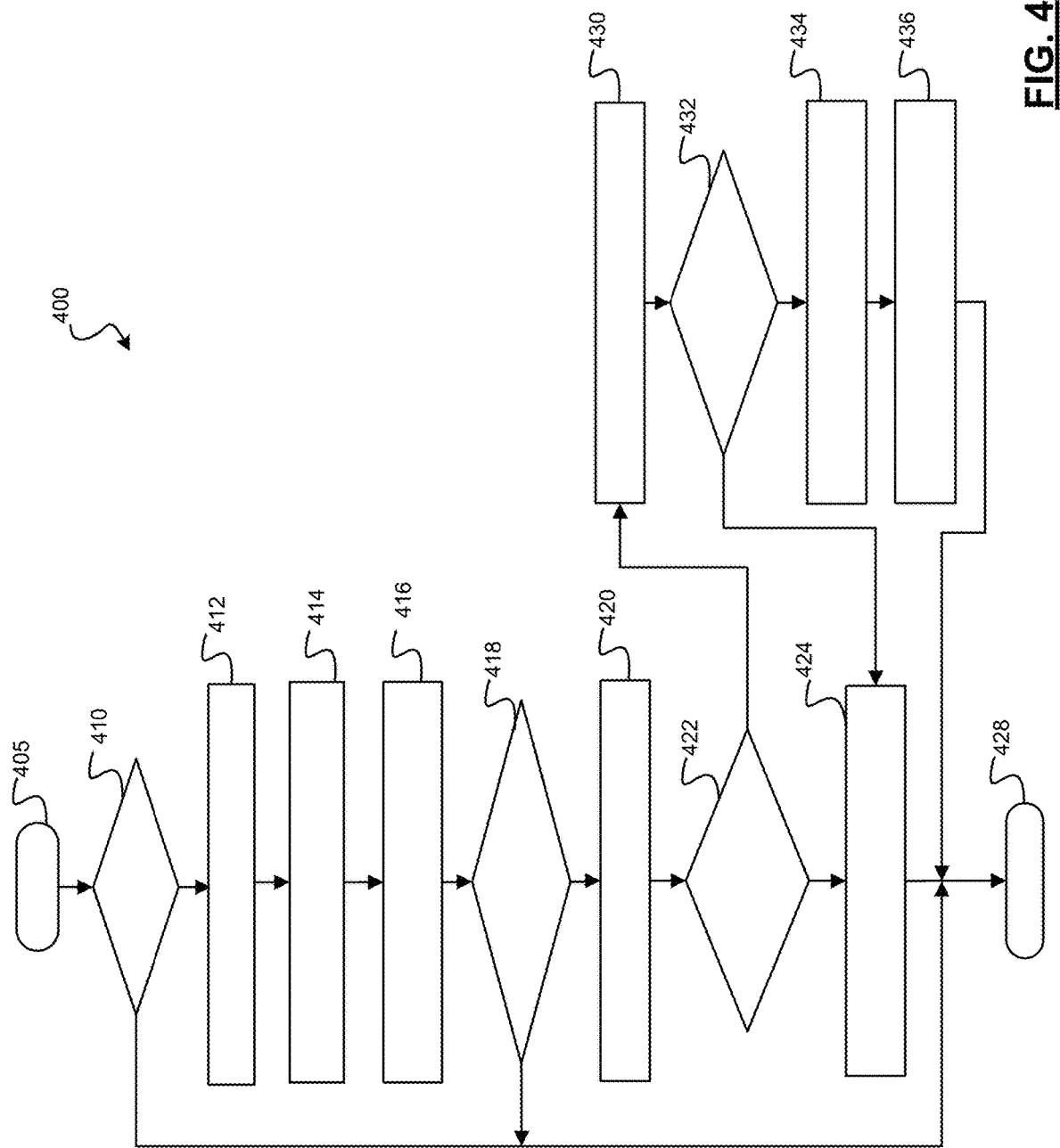
FIG. 4 is a process flow chart depicting example processes for blind spot alert methods, in accordance with various embodiments.

Referring now to FIG. 4, and with continued reference to FIGS. 1-2, a flowchart illustrates a process 400 that can be performed by the blind spot alert system 100 of FIGS. 1-3 in accordance with the present disclosure. As can be appreciated in light of the disclosure, the order of operation within the process 400 is not limited to the sequential execution as illustrated in FIG. 4 but may be performed in one or more varying orders as applicable and in accordance with the present disclosure. In various embodiments, the process 400 can be scheduled to run based on one or more predetermined events, and/or can run continuously during operation of the vehicle 10, and/or may be run offline prior to operation of the vehicle 10.

In one example, the process 400 may begin at 405. It is determined whether the vehicle 10 has approached an intersection at 410. When it is determined that the vehicle 10 has not approached an intersection at 410, the process 400 may end at 428.

When it is determined that the vehicle 10 has approached the intersection at 410, environment sensor data is received at 412 and road user data is determined, including but not limited to, a type, a trajectory, a size, and a location of each identified road user at 414. The predefined blind spot areas are obtained at 416. Thereafter, the size and location of the road users are compared with the blind spot areas including, for example, the passenger side blind spot area and the driver side blind spot area at 418.

When it is determined that a road user is located in a blind spot area for a threshold amount of time, for example greater than a threshold percent (e.g., sixty percent, or some other value) in the passenger side blind spot or greater than another threshold percent (e.g., fifty percent, or some other value) in the driver side blind spot, the road user is determined to be a vulnerable road user and the driver's line of sight is determined and evaluated at 420 and 422.

When the vulnerable road user is determined to be in the line of sight of the driver at 422, the alert is suppressed at 424. Thereafter, the method may end at 428. When the vulnerable road user is determined to be outside of the line of sight of the driver at 422, the line of sight is monitored for a defined amount of time at 430 and 432. When a change in head position is identified within the amount of time at 432, the alert is suppressed at 424 as it is concluded that the driver noticed the vulnerable road user and the process 400 may end at 428.

When the vulnerable road user is determined to not be within the line of sight of the driver at 422, and a change in head or gaze position is not identified at 432, alert criteria are determined, for example, based on ambient light conditions, at 434 and the alert signal data is generated to alert the driver via the alert system 37 at 436 Thereafter, the process 400 may end at 428.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for initiating an alert to a driver in a vehicle, comprising:
   receiving, by a processor, sensor data associated with an environment of the vehicle;
   determining, by the processor, at least one road user based on the sensor data;
   determining, by the processor, at least one blind spot area associated with a front pillar of the vehicle and a road scenario;
   determining, by the processor, that the at least one road user is a vulnerable road user based on the at least one blind spot area and a size and location of the at least one road user when a percentage of the at least one road user is within the at least one blind spot area for a first threshold time associated with a distance of the at least one road user from the vehicle;
   determining, by the processor, a line of sight of the driver using sensor interior environment sensors;
   determining, by the processor, the vulnerable road user is outside the line of sight of the driver; and
   in response to the determining the vulnerable road user is outside the line of sight of the driver for a second threshold time without a change in the line of sight of the driver including determining whether a change in head position or eye gaze of the driver is above a change threshold, and, generating, by the processor and when the change threshold is met, alert signal data to an alert system of the vehicle to illuminate the front pillar.

2. The method of claim 1, further comprising determining the percentage within the at least one blind spot area of the at least one road user based on the size and the location of the at least one road user, and wherein the determining the at least one road user is the vulnerable road user is based on the percentage within the at least one blind spot area.

3. The method of claim 2, further comprising comparing the percentage within the at least one blind spot area to a threshold percent, and wherein the determining that the at least one road user is the vulnerable road user is based on the comparing.

4. The method of claim 1, defining the at least one blind spot area based on the road scenario, a dimension of the front pillar, and an orientation of the front pillar.

5. The method of claim 1, further comprising when it is determined that the vulnerable road user is not within the line of sight of the driver, monitoring the line of sight of the at least one road user for the change, and when the change does not exceed a threshold change generating the alert signal data to the alert system of the vehicle.

6. The method of claim 1, wherein the alert system includes color changing fabric associated with the front pillar of the vehicle.

7. The method of claim 1, wherein the alert system includes at least one light configured to illuminate the front pillar of the vehicle.

8. The method of claim 1, wherein the alert signal data includes at least one of a color, a brightness, and a frequency of light to be illuminated by the alert system.

9. A system for initiating an alert a driver in a vehicle, comprising:
   a controller configured to, by a processor:
      receive sensor data associated with an environment of the vehicle;
      determine at least one road user based on the sensor data;
      determine at least one blind spot area associated with a front pillar of the vehicle and a road scenario;
      determine that the at least one road user is a vulnerable road user based on the at least one blind spot area and a size and location of the at least one road user when a percentage of the at least one road user is within the at least one blind spot area for a first threshold time associated with a distance of the at least one road user from the vehicle;
      determine a line of sight of the driver using sensor interior environment sensors;
      determine the vulnerable road user is outside the line of sight of the driver; and
      in response to the determining the vulnerable road user is outside the line of sight of the driver for a second threshold time without a change in the line of sight of the driver, generate alert signal data to an alert system of the vehicle to illuminate the front pillar.

10. The system of claim 9, wherein the controller is further configured to determine the percentage within the at least one blind spot area of the at least one road user based on the size and the location of the at least one road user, and wherein the determining the at least one road user is the vulnerable road user is based on the percentage within the at least one blind spot area.

11. The system of claim 10, wherein the controller is further configured to compare the percentage within the at least one blind spot area to a threshold percent, and wherein the determining that the at least one road user is the vulnerable road user is based on the comparing.

12. The system of claim 9, wherein the controller is further configured to define the at least one blind spot area based on the road scenario, a dimension of the front pillar, and an orientation of the front pillar.

13. The system of claim 9, wherein the controller is further configured to when it is determined that the vulnerable road user is not within the line of sight of the driver, monitor the line of sight of the at least one road user for the change, and when the change does not exceed a threshold change, generate the alert signal data to the alert system of the vehicle.

14. The system of claim 9, wherein the alert system includes color changing fabric associated with the front pillar of the vehicle.

15. The system of claim 9, wherein the alert system includes at least one light configured to illuminate the front pillar of the vehicle.

16. The system of claim 15, wherein the at least one light is configured along a side of the front pillar.

17. The system of claim 15, wherein the at least one light is integrated with the front pillar.

18. The system of claim 9, wherein the alert signal data includes at least one of a color, a brightness, and a frequency of light to be illuminated by the alert system.

19. The system of claim 9, wherein change in the line of sight of the driver is determined by evaluating whether a change in head position or eye gaze of the driver is above a change threshold.

20. The system of claim 19, wherein the alert signal data is generated by the processor only when the change threshold is met.

* * * * *